Patented July 16, 1935

2,008,144

UNITED STATES PATENT OFFICE 2,008,144

STRUCTURAL ADSORPTIVE CARBON AND PROCESS OF MAKING THE SAME

Jacque C. Morrell, Oak Park, Ill.

No Drawing. Application July 22, 1932, Serial No. 624,050

13 Claims. (Cl. 252—3)

This invention relates to the production of adsorptive or activated carbons. More particularly, it relates to an improvement in the concepts and processes of my previously issued patents for the production of adsorptive charcoals or activated carbons. These issued patents are #1,478,985, December 25, 1923, Artificial or synthetic charcoal and process of producing the same; #1,478,986, December 25, 1923, Manufacture of artificial charcoal; #1,478,987, December 25, 1923, Production of adsorbent charcoal; #1,530,392, March 17, 1925, Process of making compound adsorbent catalysts; #1,530,393, March 17, 1925, Process of making adsorbent carbon. More particularly, the present application is a continuation in part of my copending application #608,852, filed May 2, 1932.

It is the main object of this invention to produce structural adsorptive or activated carbons. In activated carbons of this type it is very important that the supporting walls of the individual particles be dense or firm and that the particle or grain itself possess the necessary structural strength required of the granular type of carbons. As examples are the carbons which possess sufficient structural strength to permit their use in filter columns or beds without excessive disintegration, comparable to bone black, such as is employed in filter columns in the refining of sugar, or to the activated charcoals such as cocoanut char used for vapor adsorption from gases, in gas masks, catalysts, etc. The structural strength of these and other types of chars is of highest importance since the life of the material depends upon its maintaining its original size and granular form. The term structural activated carbon as used in the claims further means a material which may be employed in a granular condition and implies the necessary structural strength to withstand or resist shattering, abrasion and crushing for practical purposes and to be retained in a granular or particle form of relatively large size.

The product of the present process may be employed in various industrial processes as a decolorizing and purifying agent for the removal of color and impurities from liquids and solutions, the removal of vapors from gases, purification of air, as a catalyst, and in general it may be applied wherever adsorptive decolorizing or purifying material of structural character is required. It is to be understood, of course, that the structural product may be reduced in size and may be used in a finely divided or powdered condition. Among its specific uses are the refining and decolorization of oils and their derivatives; the refining and decolorizing of mineral, animal and vegetable oils; as a catalyst; for decolorizing, purifying and refining sugar solutions, syrups such as those from cane, corn, maple and sorghum, glycerine, and aqueous and non-aqueous solutions of organic and inorganic compounds; purification of water and as a deodorant. Other uses are: purification of gelatins, phenols, drugs, pharmaceuticals, and the bleaching and purification of various crude and partly refined off-grade and off-flavored food and vegetable oils, including cottonseed, linseed, rapeseed, cocoanut, soya bean, and animal oils and fats, such as lard, fish oils, medicinal oils, etc. Some special fields of application are: industrial water, garage wastes, paint oils, varnishes and resins, and medicinals generally.

It is, of course, to be understood that when the product of the process is ground, or otherwise reduced to finely divided form, it is valuable for many of the purposes heretofore referred to and its use in this form would depend upon the particular problem and the results desired. The method of employing the powdered char, however, is entirely different from that of the structural char and the function of the material itself may be different.

In one of its specific aspects the present invention comprises mixing an organic material, preferably in finely divided form, with a binder which chars on heating, preferably of pitch characteristics, molding, briquetting, compressing or extruding the mixture under a substantial pressure, comminuting the molded material and subjecting it to a temperature adequate to carbonize the binder and thereafter subjecting the carbonized product to an activation treatment such as treatment with steam at elevated temperatures or with other mild oxidizing agents. If the mixture is molded into relatively small briquettes or pellets it may be carbonized directly without comminuting the same. The final product is granular in form and of suitable size. In some cases the product is subsequently treated with a solvent, such as hot water and/or dilute acids, to remove ash or inert substances therefrom. The final product of the present invention is of structural form and may be employed in filter columns, beds, etc. The organic material is generally of vegetable or animal origin. The binder is of a tar or pitch character, preferably, but may include binders with similar characteristics.

In some cases a carbonaceous material, such as coal, coke, charcoal and the like, may be mixed with the organic material and the binder, preferably coke, as this material improves the structural character of the product greatly.

In another specific aspect the process of the invention consists in mixing an organic material, preferably in finely divided form, with an emulsion of a binder which chars on heating, separating the water and/or drying, and then continuing the process as described above, namely, molding, heating to carbonize the binder, preferably comminuting before carbonizing, and activating the resulting product.

The process of making an emulsion of a binder suitable for the purpose is described in my Patents #1,440,355 and #1,440,356, but of course I do not wish to be limited to such emulsions, as other emulsions of suitable binders which char on heating may be employed.

The best types of structural charcoals or carbons are those which possess a large degree of porosity of the duct or sponge type, i. e., continuous of the proper size and character while at the same time having the necessary supporting structural strength to withstand disintegration in the uses for which such structural chars are employed. It is this quality that is supplied to the product by molding, briquetting or extruding under pressure. To further assist in obtaining the necessary strength while maintaining adsorption efficiency mixtures of specific types and in some cases specific proportions of carbons and of specific types and in some cases specific proportions of binders are employed in connection with the present invention.

In briquetting, molding or extruding the pressure may vary from several hundred pounds per square inch or sufficient pressure only to mold the mixture to several hundred tons. Preferably in excess of one ton per square inch is employed.

In contradistinction to the processes of my prior patents and applications, the present invention employs instead of a carbon base per se an organic material which by definition contains carbon and which also contains hydrogen, and which usually also may contain oxygen and further may contain various amounts of nitrogen, sulphur, phosphorus and elements of an ash-like character. The organic substance employed must char when heated to a sufficiently high temperature as one of its characteristics and leave a substantial residue which in turn contains a relatively large percentage of carbon.

The organic materials from which the product of the present process may be made are in general of a solid and non-fusible character and may be obtained from a large number and variety of vegetable materials, e. g., various woods, particularly hardwood such as maple, oak, hickory, birch, beech, logwood; softwoods such as poplar, pine, spruce, hemlock, cedar, straws and hulls from various grains such as oats, wheat, rye, rice, barley and the like; cornstalks and corncobs, bagasse, nut hulls and shells, fruit kernals and pits, oil cake and similar materials. Those substances of a carbohydrate or cellulosic character are preferred. Various animal products, for example, casein, albumen, gelatin and waste products, may also be employed, although the materials of vegetable origin are preferred. In general, the organic materials selected are those which char without fusing or melting in the ordinary sense. These and similar materials will be referred to in general as the first class or primary organic materials. It is preferred that they be employed as a flour or in finely divided condition.

It is also one of the particular purposes in the present invention to utilize a second class of materials, intermediate and in some cases waste products from the treatment of organic substances or residues from partly converted organic materials instead of the primary organic materials such as slops from alcohol manufacture, vegetable oil residues, furfural residues, oak tan, acid or otherwise treated wood residues (such as is obtained in the saccharation of cellulose) and the like. These may comprise, as in the case of furfural residue, a partially carbonized material resulting from chemical treatment usually at elevated temperatures, e. g., the residues remaining after the acid treatment of corncobs, grain straws and hulls and the like. In this class the residue resulting from the treatment of materials of a cellulosic character, such as grain straws and hulls with an acid and particularly oat hulls with sulphuric acid to make furfural is a preferred raw material.

The third general class of organic materials employed in the present invention are those which have been partially carbonized by heat treatment or which are found in nature in a partially carbonized condition and which in general may not be considered as a carbon or be made up of a mixture which is essentially carbon. This class may include most peats and a few lignites of relatively low carbon content and similar substances found in nature, as well as the organic substances referred to which have been subjected to a partial and generally relatively low degree of carbonization only. In some instances members of this class may resemble the second class. It is recognized that it may be difficult to draw a fine line of demarcation between some members of this group which might in some instances be classified as carbons and those which just border on it.

The following table shows approximate analyses of wood, straw, peat, lignite, bituminous coal and anthracite. In general, the wood, straw and peat may be classified as organic material, whereas the lignite, bituminous coal and anthracite are usually classified as carbonaceous materials.

|  | Carbon | Hydrogen | Oxygen | Nitrogen |
|---|---|---|---|---|
| Wood | 49.65 | 6.23 | 42.20 | 0.92 |
| Straw | 48.27 | 6.35 | 44.75 | 0.63 |
| Peat | 55.44 | 6.28 | 35.56 | 1.72 |
| Lignite | 72.95 | 5.24 | 20.50 | 1.31 |
| Bituminous coal | 84.24 | 5.55 | 8.69 | 1.52 |
| Anthracite | 93.50 | 2.81 | 2.72 | 0.97 |

Peats usually contain less than 60% of carbon while lignites usually contain more than this amount, although there are some exceptions. Since the third class of substances may in some instances be on the border line with carbons, in general this class will refer to those substances which are normally solid (not a liquid), which do not melt on heating and which are not generally classified as carbons. Some partially carbonized materials, either artificially produced or naturally occurring, may belong to this class.

It is to be particularly pointed out that the three foregoing classes of substances, while somewhat related, are however not equivalent to each other. In fact, the members of any one of the classes will give somewhat different results, the particular class selected and the particular material selected from any one class depending upon the results desired, conditions of treatment and binder employed.

The invention also comprises mixing with the organic materials a carbonaceous substance, such as materials which may be made by the carbonization of the primary substance or from some other source, for example, charcoals, cokes, coal, carbon black, etc., and in particular admixing with the organic material a relatively inactive carbon such as coke from petroleum, coal and the like, and thereafter mixing with a binder which chars on heating, preferably of pitch-like character, and continuing the treatment as described, namely, heating and activating. The decomposition of the organic material produces a carbon principally of the so-called alpha type, being generally of a deep black color, soft, dull, velvety or non-graphitoidal in character in contradistinction to the greyish and inactive graphitoidal variety, in which class coke may be included for present purposes. It is also believed that the simultaneous decomposition of the organic material and pitchy binders while in contact with each other causes an improvement in the active character of the carbon produced from the latter.

The term "coal" includes lignites and brown coals, as well as low, medium and high rank bituminous and anthracite, and sub-bituminous, semi-bituminous and semi-anthracite coals.

The term "coke" as used in the claims includes the carbonaceous residues from the destructive distillation of mineral carbonaceous and hydrocarbonaceous materials, including coals comprising anthracite and bituminous coals, lignites and intermediate types, as well as from the destructive distillation and/or cracking of petroleums, oils, tars, pitches, asphalts and the like, from all sources.

The binders used in the present case are generally those which melt or fuse and which char on heating and are preferably pitches, which in general are the residues produced from organic substances which decompose when subjected to destructive distillation in complete or partial absence of air and to such an extent that a complete carbon residue is not produced. Some of the common classes of pitches are: (a) Tar pitches, which include those produced from the tars of wood, bone, coal, shale, lignite, peat, straw, hulls and bitumens, water gas and oil gas tars; (b) Oil pitches, including the residues from distillation and cracking of animal, vegetable and in some cases petroleum oils of asphalt, paraffin, naphthene or other base; (c) Pitches from destructive distillation of animal and vegetable matter, including those of stearin, palm oil, bone fat, packing-house fat, garbage, sewage, grease, etc.; (d) Pitches resulting from the destructive distillation of native bitumens, asphalts, asphaltites, coal, peat, lignite, etc. Specifically, coal tar and wood tar pitches are preferred as binders. These pitches and corresponding tars may be employed in the present invention, the pitches however being preferred as the products produced therefrom are generally superior and more readily activated; hence the two classes are not strictly equivalent. Various oils (in many cases from the tars mentioned above) may be used in conjunction with the above pitches as binders, e. g., coal tar oils, wood tar oils, etc.

While I prefer to employ the process of mixing the organic material with an emulsion of a pitch-like binder, other methods of incorporating the organic material with the binder may be employed, such as those previously disclosed in the aforementioned issued patents for mixing carbon with the binder. Some of the methods of accomplishing the mixing are:

(a) The organic material, preferably in finely divided condition, may be mixed directly with the emulsified binder, either as such or the organic material, preferably in finely divided condition, may be suspended in an aqueous medium and mixed with the emulsified binder. In most cases the water contained in the emulsion will be separated by filtration, etc., but in some cases the mixture containing the emulsion may be heated directly to carbonize the binder.

(b) The organic material, preferably in finely divided condition, may be mixed with a solution of a binding material which chars on heating, separating the solvent by distillation. The solvent may be a relatively low boiling liquid such as benzol, naphtha, petroleum hydrocarbons or coal tar fractions, or higher boiling solvents may be used and separated during the carbonizing treatment.

(c) The organic material, preferably in finely divided condition, may be mixed with a liquid binder which chars on heating, such as a tar directly produced or similar product thereto such as an oil added to a pitch.

(d) The organic material, preferably in finely divided condition, may be mixed with non-fluid (solid) pitch or other non-fluid binder which chars on heating and may also thereafter be mixed with a fluid such as oil, tar, or other organic liquid which will dissolve, disperse or flux with the binder.

(e) The organic material, preferably in finely divided condition, may be mixed directly with a pitchy binding material by heating the same, thus rendering it fluid, and intimately mixing the organic material (preferably in finely divided condition) therewith, preferably by mechanical means.

In some cases it may be desirable to add to the mixture of organic material and binder a substance which is to be later removed by solution with a solvent, for example, calcium or magnesium carbonate, calcium or magnesium oxide, or in general finely divided metals, oxides of metals, salts, etc. These substances may be removed from the carbonized and activated product by treatment with a solvent, for example, water when the material is water-soluble, and a dilute acid, for example, hydrochloric, when the material is acid-soluble. It may also be desirable to add substances to the material which will volatilize and/or react with the organic material or carbon resulting therefrom during the treatment, such as for example zinc chloride, phosphoric acid and similar materials.

It is to be understood that the above methods are not to be considered as equivalent in the sense of quality of product or results produced, the particular method chosen depending on the raw materials employed and the results desired.

The following description shows one of the methods of operating the process: Finely divided wood, nut hulls, grain hulls, straw, etc., preferably in finely divided condition or in the form of flour, is mixed with water, which may contain a protective colloid, to make a thick paste of the same. The protective colloid may consist of any of the classes of materials described in my issued Patent #1,440,356, for example, ammonium tannate or casein. The latter is prepared by dissolving the casein in a dilute solution of an alkali such as sodium hydroxide, sodium carbonate or ammonia.

An emulsion of soft pitch is prepared by first suspending finely divided hard pitch, for example, coal tar or wood tar pitch (preferably employing wood tar pitch where coke or coal is used in the organic base) sufficiently hard to grind, for example, of approximately 220° F.–300° F. melting point in water containing a protective colloid, for example, casein dissolved in a dilute alkali, and then preparing an emulsion of a coal tar (or other tar) distillate, for example, anthracene oil, creosote oil, or the like, by agitating the oil with an equal volume of an emulsifying agent, which consists of water containing dissolved therein one of the classes of protective colloids previously referred to, for example, casein dissolved in an alkali solution. The suspension of pitch and emulsion of oil are mixed and the resulting emulsified binder is mixed with the finely divided organic material. The water is separated preferably by filtration, and the mixture preferably subsequently dried and then molded, briquetted or extruded. The molded material or briquettes are then crushed, ground or comminuted and subjected to heat treatment to carbonize the same. The carbonized product is then subjected to activation by steam treatment or other oxidizing gas, or other activating treatments. In the molding process pressures varying from several hundred pounds per square inch or only sufficient to mold the mixture to several hundred tons may be employed. The steam-treated char is preferably subjected to treatment with hot water and/or dilute acids, such as hydrochloric acid, to remove ash or other impurities, subsequently water washed and then dried.

In the carbonizing treatment temperatures of from approximately 900° F. to 1800° F., more or less, may be employed. For steam activation or other gas activating treatments temperatures of from 1200° F. to 1800° F., more or less, may be employed. The acid concentrations for the treatment of the activated products (when employed) may vary from less than 1% to 10% and upwards and various acids may be employed, such as hydrochloric, sulphuric, etc. During carbonization and activation the time of treatment will depend upon temperature conditions as well as other conditions and schedules varying from fifteen minutes up to several hours and longer have been employed.

A more specific example describing the preparation of decolorizing and/or adsorbent charcoal according to my process is given below.

The raw material used in this particular example is finely divided wood or wood flour, preferably from hardwood such as maple, oak, hickory, birch and the like, or a mixture of the same, preferably of approximately 50 mesh and upward. Pitch from the distillation of wood, preferably hardwood pitch or a coal tar pitch of approximately 250° F. melting point, or of sufficient hardness to be ground, is employed in making the suspension of the binder. The pitch is ground approximately 50 mesh and upward, preferably by first crushing and then grinding wet in a ball mill, using a protective colloid such as casein which is dissolved in an alkali solution, preferably sodium carbonate solution or dilute ammonia. Creosote oil from the distillation of high temperature coal tar or other coal tar distillate is emulsified in the solution made by dissolving casein in an alkali, such as sodium carbonate. The emulsion of oil is added to the suspension of pitch, or vice versa, to prepare the emulsified binder, as disclosed in my Patent #1,440,356. As an example of the preparation of the casein solution, approximately 1% by weight of sodium carbonate may be dissolved in water, the solution heated to approximately 150° F. and into the heated alkaline solution is stirred approximately 2% by weight of casein. The solution is preferably allowed to cool before using.

The solution may be diluted before making up the pitch suspension, which may be prepared by adding an equal part by weight of the diluted solution to the finely divided pitch, stirring vigorously and then preferably subjecting the paste or suspension to a grinding or attrition action, such as in a ball mill. To this is added an emulsion of coal tar (or wood tar) distillate, preferably creosote oil prepared by emulsifying the oil in an equal part of the afore-mentioned casein solution. In preparing this emulsion the oil may be added slowly to the casein solution and vigorously agitated during or between additions until the required quantity of oil has been added. The oil emulsion is then mixed with the pitch suspension, the resulting system containing a stable emulsion of soft pitch in the proportion, for example, of 50 to 60 parts of the creosote oil for each 100 parts of the hard pitch. It is desirable to add to the emulsion of soft pitch prepared as described a small amount of ammonium tannate solution to stabilize the same.

The finely divided wood or wood flour, preferably of 50 mesh and upward, is then mixed with the emulsion. Preferably it is moistened with or suspended in some of the dilute casein solution. As one example, a final mixture of creosote oil, pitch and wood flour may contain approximately 50 to 60 parts of oil, 100 parts of pitch and 375 parts of finely divided wood or wood flour by weight and in addition there will be present very small amounts of soda ash or sodium carbonate and casein. The finely divided wood or wood flour may vary from approximately 200 parts to 600 parts, more or less.

As a general rule, only sufficient water is present with each of the individual components to permit thorough mixing so that preferably the various components are finally suspended in water to the consistency of a thin paste. Generally speaking, somewhat in excess of an equal quantity of water containing the protective agents, such as sodium carbonate and casein, is required relative to the suspended materials. After thoroughly mixing all the components the water is separated, preferably by filtering. A vacuum type filter has been found suitable for this purpose. In some cases the addition of a filter aid facilitates filtration.

The residue on the filter is then dried by heating, for example, starting with a temperature of 250° F. and completing at approximately 190° F. During drying lumping may occur, and it may be desirable that the mixture be kept in more or less a state of agitation to obtain proper drying, and it is not necessary that the mixture be completely dried as the presence of small amounts of water facilitates molding or briquetting. In some cases the mixture of emulsified binder and organic material may be molded directly, the amount of water in such cases being kept to a minimum. The mixture, preferably while warm or heated, is molded or briquetted preferably at pressures varying from one ton to ten tons per square inch, e. g., I have found pressures of 2.5 tons per square inch quite satisfactory. The molded product or briquettes are crushed and ground to the desired size and carbonized. In some cases they are ground to 8 mesh and upwards, carbonized and then subsequently ground to smaller size if desired for further treatment. If used for filtering liquids the product prior to carbonizing may be ground to smaller size as desired, e. g., 15 to 20 mesh and smaller. The principal question here is to avoid losses in going through several grinding operations.

While I have described in detail the preparation of a mixture by one of the methods employed in the present invention in preparing the mixture of carbon and binder, it is to be understood that other methods such as those previously described may be employed, for example, the organic material may be mixed directly with a soft pitch binder or a solution thereof, or with a finely divided hard pitch binder alone or by the addition later of a small amount of solvent for the binder, in general with a binder which chars on heating, and subsequently subjected to carbonization.

In the carbonization operation, heating schedules from twenty to sixty minutes at temperatures varying from 1200° F. to 1500° F. have been found satisfactory. Generally speaking, carbonization in thin layers is preferred. The use of a continuous rotary type of retort has been found satisfactory. The principal object here is to heat the material uniformly and prevent formation of secondary inactive carbon. After the carbonization treatment the charge is subjected to a second heat treatment in the presence of steam at temperatures between approximately 1500° F. and 1800° F. for about twenty minutes to two hours. In some cases it has been found desirable to introduce steam into the charge while undergoing carbonization. The activated char may then be washed with a dilute acid, such as hydrochloric acid, and water-washed and finally dried.

While I have described in detail the preparation of a mixture by one of the methods employed in the present invention in preparing the mixture of finely divided wood or wood flour (or other organic material) and binder, it is to be understood that other methods such as those previously described may be employed, for example, the finely divided wood or wood flour may be mixed directly with a soft pitch binder or a solution thereof, or with a finely divided hard pitch binder alone or by the addition later of a small amount of solvent for the binder, in general with a binder which chars on heating, and subsequently subjected to carbonization. The method employed depends upon materials used and results desired.

The product obtained by the above treatment when employing a coal tar pitch as a binder would show a decolorizing efficiency of approximately 90%, employing a ratio of finely divided wood to the binder of approximately 4:1 when compared with a good grade of bone black showing a color removal of approximately 80% employing a standard solution of raw sugar, the tests to be made under similar conditions.

In another example the same procedure shown above is followed with the exception that approximately 60% of a finely ground petroleum coke is mixed with the wood flour prior to mixing the binder with the same. When employing a coal tar pitch with such a mixture the decolorizing efficiency on the same basis will be approximately 75%, and when employing wood tar pitch as a binder the decolorizing efficiency will be approximately 80%. The coal tar pitch binder, however, gives a much better structure than the wood tar pitch binder. The other materials shown may also be employed instead of wood, although with varying results.

In another example the residue obtained from the sulphuric acid treatment of oat hulls for the manufacture of furfural is employed, representative of the second class or group of materials referred to herein. The ratio of furfural residue to binder in this specific example is approximately 2.5 to 1, employing a coal tar pitch binder. Approximately 50% of coal tar distillate, such as creosote oil, by weight of the pitch is employed in making the emulsified binder, which is the form of binder used in this instance. The procedure and conditions for the preparation of the char is as described in the previous example. The product has a decolorizing efficiency of approximately 85%.

As representative of the third class of substances, finely ground peat is employed in the manner described above and products varying from 75% to 85% decolorizing efficiency may be prepared. Partially charred materials from the first class also give good results.

The introduction of petroleum coke or similar coke into the mixture, employing various proportions of coke and in some cases as high as 90% of coke, improves the hardness and structural character of the finished product, although the decolorizing efficiency is somewhat lessened thereby. The use of coke and similar materials together with organic materials to improve hardness is one of the specific features of the invention.

Similar results, varying however in uniformity and to some extent in quality of product, may be obtained by employing the other methods of mixing the binder with the base organic or other carbon forming material employed (selected from the three classes mentioned above to furnish the carbon). Mixtures of carbon with the materials mentioned or mixtures of various members of the three classes cited above may also be employed as the base material for the manufacture of activated charcoal.

It is usually preferred that the organic material or other base material, or mixtures thereof, be ground to preferably 200 mesh or above, although approximately 50 mesh and above may be found satisfactory.

Apparently the type of carbon formed from the decomposition of the organic material influences the character of the carbon formed from the carbonization of the pitch in the mixture, causing the formation of an active carbon or one which is easily rendered active.

When employing an organic material such as is mentioned in class 1 and a hardwood tar pitch binder the ratio of the former to pitch employed in the mixture may be approximately 1 to 6 parts of the organic material to approximately 1 part of the pitch. A similar ratio may be used when coal tar pitch is employed as a binder. When employing members of the second class of materials mentioned a somewhat smaller amount of pitch may be employed. When employing materials from the third class of substances mentioned, for example, a typical peat, the ratio of peat to hard pitch employed would be approximately 2:1 to 4:1. A somewhat larger proportion of pitch is used when it is incorporated direct as a soft pitch. In general, as the volatile matter in the pitch increases its relative proportion is increased within certain limitations.

The proportions of various materials cited herein are given merely as examples and they may vary more widely depending on the results desired; for example, a larger ratio of basic organic material or materials of the other classes mentioned herein to the binder may be employed in some cases. In general, the materials selected and the proportions thereof will depend upon the results desired and conditions of treatment.

The term "non-reactive binder" as used in the claims refers to a binder which does not normally undergo chemical reaction with the other components of the mixture of which it is a part.

The examples given are for illustrative purposes only and it may be readily recognized that many combinations may be employed within the scope of the invention. It may also be recognized that proportions and conditions of treatment may vary within limits and that the specific examples are not to be considered as limitations upon the broad scope and spirit of the invention.

I claim as my invention:

1. A process for the production of structural activated carbon suitable for refining, purifying and decolorizing purposes which comprises compressing a mixture of finely divided organic material, finely divided coke, and a substantially non-reactive bituminous binder which chars on heating, comminuting the compressed material and subjecting it to a temperature adequate to carbonize the same, then activating the resulting product by heating in the presence of steam, and then subjecting the same to the action of a solvent to remove impurities therefrom.

2. A process for the production of structural activated carbon suitable for refining, purifying and decolorizing purposes which comprises compressing a mixture of finely divided organic material, finely divided coal, and a substantially non-reactive bituminous binder which chars on heating, comminuting the compressed material and subjecting it to a temperature adequate to carbonize the same, activating the resulting product by heating in the presence of steam, and then subjecting the same to the action of a solvent to remove impurities therefrom.

3. A process of making structural activated carbon suitable for refining, purifying and decolorizing purposes which comprises mixing a mineral carbon selected from the class consisting of coals and cokes with finely divided vegetable material and with a substantially non-reactive bituminous binder which chars on heating, compressing the mixture under substantial pressure, subjecting the compressed material to a temperature adequate to carbonize and to char the said vegetable material and binder therein, and activating the resulting product.

4. A process of making structural activated carbon suitable for refining, purifying and decolorizing purposes which comprises mixing a mineral carbon selected from the class consisting of coals and cokes with finely divided vegetable material and with a substantially non-reactive bituminous binder which chars on heating, compressing the mixture under substantial pressure, subjecting the compressed material to a temperature adequate to carbonize and to char the said vegetable material and binder therein, and activating the resulting product in the presence of a gas having a mild oxidizing action.

5. A process of making structural activated carbon suitable for refining, purifying and decolorizing purposes which comprises mixing a mineral carbon selected from the class consisting of coals and cokes with finely divided vegetable material and with a substantially non-reactive bituminous binder which chars on heating, compressing the mixture under substantial pressure, subjecting the compressed material to a temperature adequate to carbonize and to char the said vegetable material and binder therein, activating the resulting product in the presence of steam, and subjecting the charred and activated product to the action of a solvent to remove undesirable impurities.

6. A process of making stuctural activated carbon suitable for refining, purifying and decolorizing purposes which comprises mixing a mineral carbon selected from the class consisting of coals and cokes with an organic material selected from a group consisting of wood, stalks, straws, grain hulls, cobs, nut hulls, nut shells, fruit pits, oak tan, and the residues from the manufacture of alcohol, furfural, vegetable oils, and cellulose saccharides, and with a substantially non-reactive bituminous binder which chars on heating, compressing the mixture under substantial pressure, subjecting the compressed material to a temperature adequate to carbonize and to char the said organic material and binder therein, and activating the resulting product.

7. Activated carbon comprising a structural, charred and activated product of a compressed mixture of finely divided solid vegetable material, a mineral carbon selected from a group consisting of coals and coke and a non-reactive bituminous binder which chars on heating.

8. Activated carbon comprising a structural, charred and activated product of a compressed mixture of an organic material of animal origin, a mineral carbon selected from a group consisting of coals and coke and a non-reactive bituminous binder which chars on heating.

9. A process for the production of structural activated carbon suitable for refining, purifying and decolorizing purposes which comprises mixing a finely divided solid vegetable material with a substantially non-reactive bituminous binder which chars on heating, compressing the resulting mixture under substantial pressure, subjecting it to a temperature adequate to carbonize and to char the same, and activating by heating in the presence of an agent having a mild oxidizing action.

10. A process of making structural activated carbon suitable for refining, purifying and decolorizing purposes, which comprises molding under substantial pressure a preformed mixture of a solid vegetable material and a substantially non-reactive bituminous binder which chars on heating, subjecting the compressed material to a temperature adequate to carbonize and to char the same and activating the resulting product by heating in the presence of an agent having a mild oxidizing action.

11. A process of making structural activated carbon suitable for refining, purifying and decolorizing purposes which comprises mixing a mineral carbon selected from the class consisting of coals and cokes with finely divided wood and with a substantially non-reactive bituminous binder which chars on heating, compressing the mixture under substantial pressure, subjecting the compressed material to a temperature adequate to carbonize and to char the said organic material and binder therein, activating the resulting product in the presence of steam, and subjecting the charred and activated product to the action of an acid to remove undesirable impurities.

12. Activated carbon comprising a structural charred and activated product of a compressed mixture of a finely divided solid organic material, a mineral carbon selected from the group consisting of coals and cokes, and a non-reactive bituminous binder which chars on heating.

13. A process of making structural activated carbon suitable for refining, purifying and decolorizing purposes, which comprises mixing a mineral carbon selected from the class consisting of coals and cokes with a finely divided organic material and with a bituminous binder, compressing the mixture under substantial pressure, subjecting the compressed material to a temperature adequate to carbonize and to char the said organic material and binder, and activating the resulting product.

JACQUE C. MORRELL.